(12) United States Patent
Kani et al.

(10) Patent No.: US 8,813,377 B2
(45) Date of Patent: Aug. 26, 2014

(54) RECIPROCATING CUTTING TOOLS

(75) Inventors: Toshiyuki Kani, Anjo (JP); Masanori Hayashi, Anjo (JP)

(73) Assignee: Makita Corporation, Anjo-Shi (JP)

( * ) Notice: Subject to any disclaimer, the term of this patent is extended or adjusted under 35 U.S.C. 154(b) by 539 days.

(21) Appl. No.: 13/084,103

(22) Filed: Apr. 11, 2011

(65) Prior Publication Data
US 2011/0247223 A1    Oct. 13, 2011

(30) Foreign Application Priority Data

Apr. 12, 2010 (JP) ................................ 2010-091246

(51) Int. Cl.
*B23D 49/16* (2006.01)
*B27B 19/09* (2006.01)

(52) U.S. Cl.
USPC .............................................. 30/393; 30/394

(58) Field of Classification Search
USPC .......................................... 30/392, 393, 394
See application file for complete search history.

(56) References Cited

U.S. PATENT DOCUMENTS

| | | | | |
|---|---|---|---|---|
| 2,713,271 A | * | 7/1955 | Dodegge | 74/50 |
| 2,961,016 A | * | 11/1960 | Papworth | 30/393 |
| 3,863,342 A | * | 2/1975 | Griffies et al. | 30/393 |
| 4,272,996 A | * | 6/1981 | Sauerwein | 74/50 |
| 4,628,605 A | * | 12/1986 | Clowers | 30/393 |
| 5,031,324 A | * | 7/1991 | Berghauser et al. | 30/369 |
| 5,083,376 A | * | 1/1992 | Lentino | 30/392 |
| 5,212,887 A | * | 5/1993 | Farmerie | 30/393 |
| 5,479,709 A | * | 1/1996 | Lai | 30/123.3 |
| 7,290,343 B2 | * | 11/2007 | Hartmann | 30/394 |
| 2001/0042310 A1 | | 11/2001 | Steele | |
| 2002/0032965 A1 | | 3/2002 | Takahashi et al. | |
| 2002/0170186 A1 | * | 11/2002 | Sakaguchi | 30/394 |
| 2005/0109137 A1 | | 5/2005 | Hartmann | |
| 2005/0262710 A1 | | 12/2005 | Moreno | |
| 2007/0186425 A1 | * | 8/2007 | Tam et al. | 30/392 |
| 2008/0229591 A1 | * | 9/2008 | Saegesser et al. | 30/519 |

FOREIGN PATENT DOCUMENTS

| | | |
|---|---|---|
| DE | 100 00 982 A1 | 9/2000 |
| EP | 1 232 817 A2 | 8/2002 |
| JP | A-11-5201 | 1/1999 |

OTHER PUBLICATIONS

Sep. 6, 2011 Search Report issued in European Application No. 11161938.3.
Oct. 29, 2013 Office Action issued in Japanese Application No. 2010-091246 (w/ English Translation).

* cited by examiner

*Primary Examiner* — Hwei C Payer
(74) *Attorney, Agent, or Firm* — Oliff PLC

(57) ABSTRACT

A reciprocating cutting tool includes a motion converting mechanism configured to convert rotation of a rotary member into a reciprocating motion of a slider coupled to a rod capable of mounting a blade thereon. The reciprocating cutting tool further includes a slider support mechanism including a first support mechanism and a second support mechanism disposed at different positions along a reciprocating direction of the slider and each supporting the slider such that the slider can move in the reciprocating direction. The first support mechanism includes a first member and a second member disposed on opposite sides of the slider in a holding direction perpendicular to the reciprocating direction and each slidably contacting the slider.

10 Claims, 6 Drawing Sheets

RECIPROCATING CUTTING TOOLS

This application claims priority to Japanese patent application serial number 2010-91246, the contents of which are incorporated herein by reference.

BACKGROUND OF THE INVENTION

1. Field of the Invention

The present invention relates to reciprocating cutting tools, such as band-held cutting tools called a "jigsaw", and more specifically, to reciprocating cutting tools configured to cut workpieces by reciprocating blades.

2. Description of the Related Art

In general, a jigsaw includes a motion converting mechanism configured to convert a rotation of an electric motor as a drive source into a reciprocating motion of a blade, and a technology relating to this kind of motion converting mechanisms is disclosed in, for example, in US 2002/0032968A1 (also published as Japanese Patent No. 3710697).

The motion converting mechanism is assembled within an aluminum die-cast gear housing cover attached to a front portion of a body housing. The electric motor as a drive source is built in a tool body portion. The motion converting mechanism is configured to transmit the rotary output of the drive motor to a crank disk, cause a guide roller eccentrically attached to the crank disk to engage an angular U-shaped slider supported by the gear housing cover so as to be capable of making a vertical reciprocating motion, cause the guide roller to make an orbital motion in the slider while sliding therein and, using the vertical components of the orbital motion, cause the slider to make a vertical reciprocating motion, thereby causing a rod coupled thereto and the blade (cutting blade) mounted on the rod to make a vertical reciprocating motion.

The rod is coupled to the slider so as to be pivotable in the fore-and-aft direction with respect to the slider within a small angle, and the blade is pushed forward in a cutting direction by a backup roller. The backup roller is displaced in the fore-and-aft direction by the vertical motion of a cam plate in association with the rotation of the crank disk, so that an efficient cutting work is achieved by causing the blade to make the vertical reciprocating motion (orbital motion) while causing the same to pivot in the fore-and-aft direction.

However, the jigsaw in the related art described above has the following problems to be improved. In general, the hand-held tools of this type have a housing made of resin with a two-split structure for the purpose reduction in weight and cost. In the jigsaw described above, a resin made two-split housing structure is employed for the tool body portion in many cases. However, the gear housing cover having the motion converting mechanism built therein is formed of die-cast aluminum that is still heavy in weight. Regarding the gear housing cover, for example, since a smooth sliding motion of the guide roller with respect to the slider as well as a smooth vertical motion and a fore-and-aft reciprocating motion of the rod are required, related components are required to be assembled with a high degree of accuracy. Consequently, in the related art, the die-cast aluminum housing cover which can easily secure the accuracy by machining is attached to the inside of the body housing, and a pair of left and right guide rails configured to support the slider so as to be capable of making a vertical reciprocating motion are attached to the gear housing cover with a high, degree of accuracy. Therefore, the presence of the gear housing cover and the pair of left and right guide rails, which occupy large weight distribution ratios because of being formed of metal, makes the weight reduction of the entire jigsaw difficult.

Therefore, there is a need in the art for a reciprocating cutting tool that can be configured to have a lightweight construction.

SUMMARY OF THE INVENTION

According to the present teaching, a reciprocating cutting tool includes a motion converting mechanism configured to convert rotation of a rotary member into a reciprocating motion of a slider coupled to a rod capable of mounting a blade thereon. The reciprocating cutting tool further includes a slider support mechanism including a first support mechanism and a second support mechanism disposed at different positions along a reciprocating direction of the slider and each supporting the slider such that the slider can move in the reciprocating direction. The first support mechanism includes a first member and a second member disposed on opposite sides of the slider in a holding direction perpendicular to the reciprocating direction and each slidably contacting the slider.

DETAILED DESCRIPTION OF THE INVENTION

Figure 1:
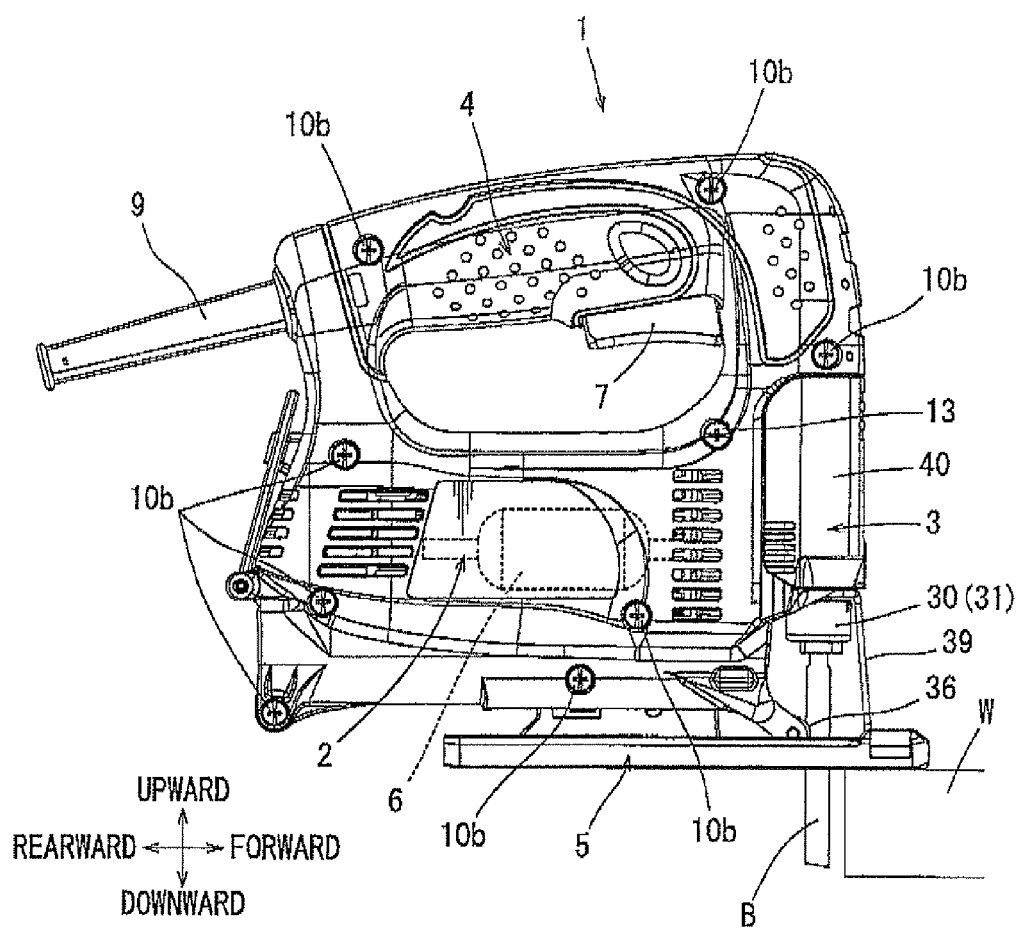
FIG. 1 is a side view of an entire jigsaw according to a first example.

Each of the additional features and teachings disclosed above and below may be utilized separately or in conjunction with other features and teachings to provide improved reciprocating cutting tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a reciprocating cutting tool includes a body housing, an electric motor and a motion converting mechanism configured to convert rotation of the electric motor into a reciprocating motion of a rod having a blade mounted thereon. The electric motor and the motion converting mechanism are disposed within the body housing. The motion converting mechanism includes a crank disk configured to be rotated by the electric motor, a guide member eccentrically mounted to the crank disk and configured to make an orbital motion by the rotation of the crank disk, and a slider capable of reciprocating in a reciprocating direction of the rod and configured to transmit to the rod a component of the orbital motion of the guide member in the reciprocating direction to cause the reciprocating motion of the rod. The slider has a flat plate shape and includes a guide plate portion and a support plate portion. The guide plate portion has a guide groove portion engaging the guide member. The support plate portion extends in the reciprocating direction of the rod. The guide plate portion is held from opposite sides in a direction of thickness of the flat plate shape, so that the guide plate portion is prevented from moving in the direction of thickness. The support plate portion is inserted into a support hole formed in a slider guide provided on the body housing, so that the support plate portion is prevented from moving in a direction perpendicular to a plane of the support plate portion.

Because the slider is held from opposite sides in the thickness direction without using a pair of left and right guide rails that are used in the known device. In addition, the movement of the support plate portion in the direction parallel to the plane of the support plate portion is prevented by inserting the support plate portion into the support hole of the slider guide. Therefore, the slider can be supported so as to be capable of making a reciprocating motion without using the pair of left and right guide rails and a gear housing for assembling the same with a high degree of accuracy of the known device, whereby reduction in weight of the motion converting mechanism and hence of the reciprocating cutting tool is achieved.

The guide plate portion of the slider may be held from opposite sides by a flange portion provided on the guide member and a support plate mounted on the body housing. With this arrangement, it is possible to downsize the motion converting mechanism in the thickness direction.

The support plate may have a flat plate shape formed into an inverted U-shape and may include a pair of left and right vertical support portions and a lateral support portion connecting upper portions of the vertical support portions. Opposite end portions of the guide plate portion of the slider are in sliding contact with the left and right vertical support portions, and the support plate portion of the slider is in sliding contact with the lateral support portion. With this arrangement, reduction in weight of the supporting plate is achieved while ensuring a required and sufficient area for supporting the slider.

The slider guide may be movable in the thickness direction of the slider to allow movement of the slider in the thickness direction. Therefor; a potential accumulative error in machining the members which constitute the motion converting mechanism and a potential assembling error in assembling these members with the body housing can be absorbed, whereby the smooth reciprocating action of the slider can be easily ensured.

The body housing may be made of synthetic resin and may be split into left and right housing halves with respect to a plane extending in a longitudinal direction of the tool. The guide plate portion of the slider may be held in the thickness direction between the guide member and a support plate attached between the left and right housing halves. The cutting tool may further include a cover made of die-cast aluminum and attached to an outer surface of the body housing. The support plate contacts the cover, so that heat produced at the support plate is dissipated via the cover. With this arrangement, because the support plate for holding the slider in the thickness direction is mounted between the left and right housing halves, it is possible to easily perform the assembling operation of the support plate. In addition, the friction heat that may be generated at the supporting plate due to the reciprocating motion of the slider is efficiently released to the die-cast aluminum cover to achieve heat dissipation, and hence the durability of the motion converting mechanism is improved.

Referring now to FIG. 1 to FIG. 8, an example will be described. In this embodiment, a jigsaw 1 is exemplified as an example of a reciprocating cutting tool. FIG. 1 shows an appearance of the entire jigsaw 1. The jigsaw 1 generally includes a tool body portion 2 having an electric motor 6 built in a resin body housing 10, a motion converting mechanism 3 assembled within a front portion of the body housing 10, a loop-shaped handle portion 4 provided integrally with an upper portion of the body housing 10, and a base 5 that supports the body housing 10 and extends along the lower portion thereof.

In FIG. 1, a user is positioned on the left side of the jigsaw 1. In a state of holding the handle portion 4 and placing the base 5 on an upper surface of a workpiece W, the user may perform a cutting operation by moving the jigsaw 1 forward (rightward in FIG. 1 as indicated by an outline arrow) for causing a blade B to cut into the workpiece W. In the following description, the fore-and-aft directions of members and configurations are defined such that the side of a direction for moving the jigsaw 1 for performing the cutting operation (hereinafter called a "cutting direction") is a front side and the side where the user resides is a rear side. Left and right sides are defined as those as view from the side of the user.

A switch lever 7 is provided on the side of a lower surface of the handle portion 4. When the user pulls the switch lover 7 upward with a fingertip(s) of his or her hand holding the handle portion 4, the electric motor 6 is activated. When the electric motor 6 is activated, the rotary output therefrom is converted into a vertical reciprocating motion of a rod 30 by a motion converting mechanism 3, described later, whereby the blade B makes a vertical reciprocating motion. A power source cord 9 is drawn into a rear portion of the handle portion 4. The electric motor 6 is activated with AC power supplied via the power source cord 9.

Figure 2:
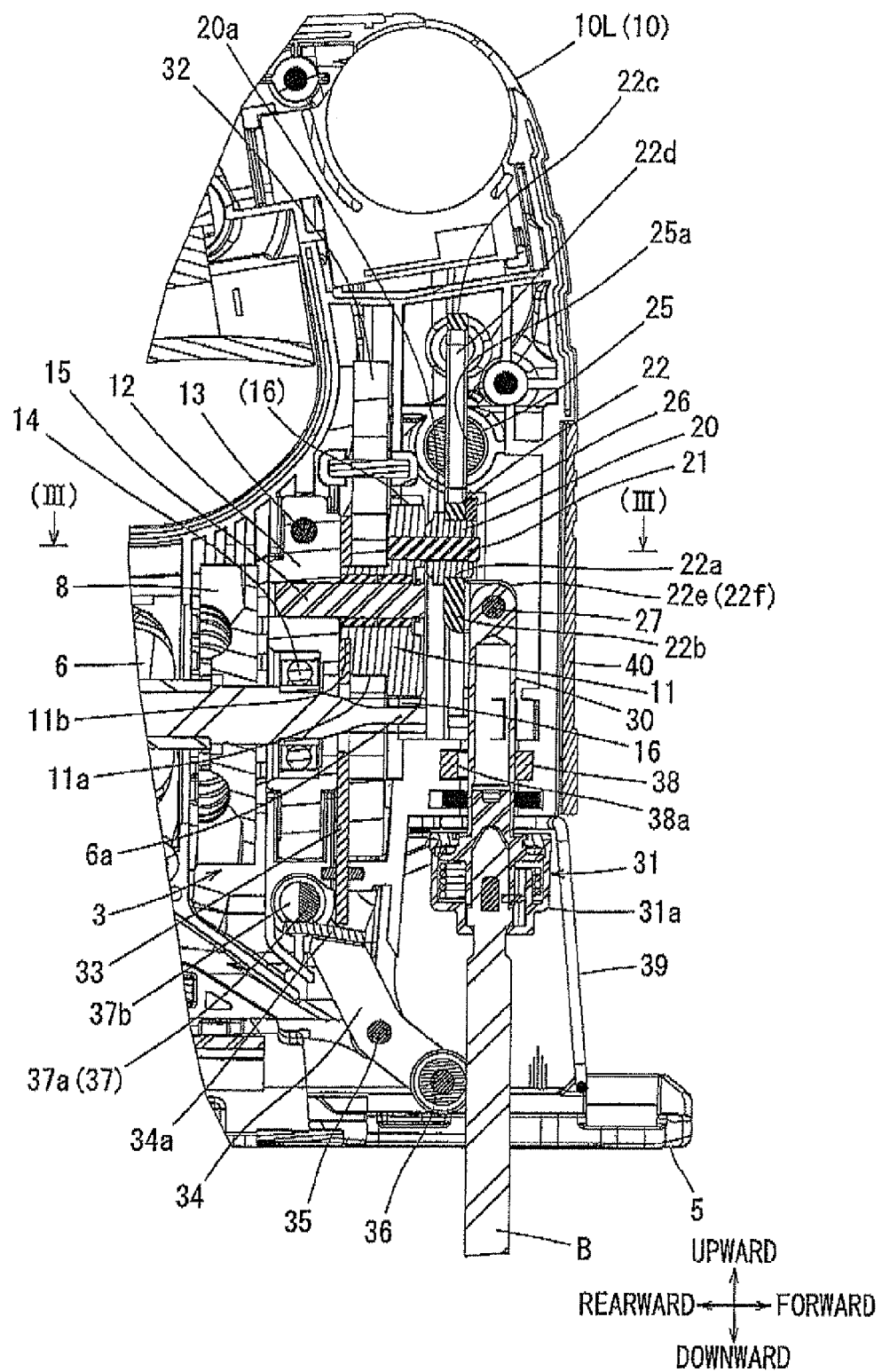
FIG. 2 is a vertical cross-sectional view of a front portion of the jigsaw and showing a motion converting mechanism of the first example.
Figure 3:
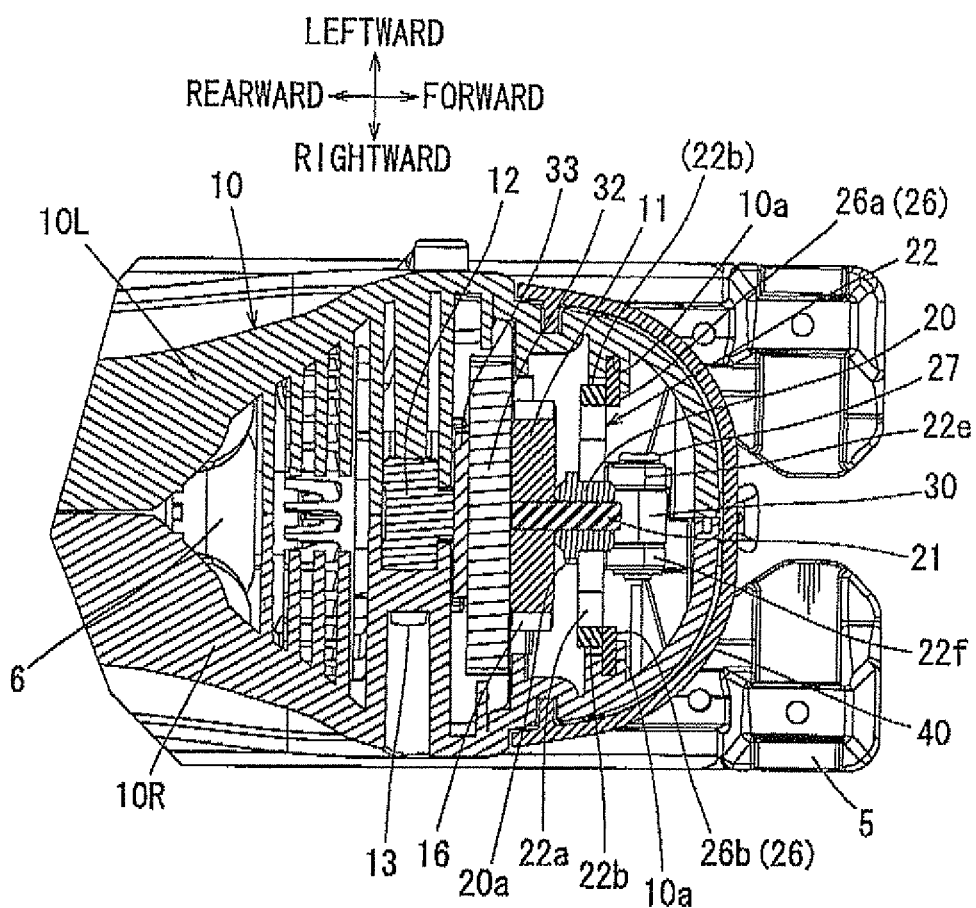
FIG. 3 is a horizontal sectional view of the motion converting mechanism taken along line III-III in FIG. 2.

The details of the motion converting mechanism 3 are given in FIG. 2 and FIG. 3. The body housing 10 has a structure split into right and left with respect to a vertical plane along a longitudinal direction of the tool (in the forward and rearward direction) and includes left and right housing halves 10L and 10R that are joined together by screws 10b after being positioned relative to each other. As shown in FIG. 3, the motion converting mechanism 3 is assembled within the front portion of the body housing 10 so as to be positioned between front portions of the left and right housing halves 10L and 10R.

A cooling fan 8 for producing a flow of air for cooling the motor 6 is attached to an output shaft of the electric motor 6, and a pinion gear 6a is formed on the output shaft as shown in FIG. 2. The pinion gear 6a is meshed with a drive gear portion 16 formed on the periphery of a crank disk 11. A support base portion 12 is disposed between the left and right housing halves 10L and 10R. As show in FIG. 3, in this example, the support base portion 12 is fixed to the right housing half 10R by a fixing screw 13. The output shaft of the electric motor 6 is rotatably supported by the support base portion 12 via a bearing 14. The crank disk 11 is rotatably supported by a support shaft 15 provided on the support base portion 12. As the electric motor 6 rotates, the crank disk 11 is rotated about the supporting shaft 15 via the drive gear portion 16.

A guide member 20 is supported on a front surface of the crank disk 11. The guide member 20 is rotatably supported by a-support shaft 21. The support shaft 21 is offset by a certain distance from the support shaft 15. Therefore, when the crank disk 11 is rotated by the electric motor 6, the guide member 20 makes an orbital motion about the supporting shaft 15.

Figure 4:
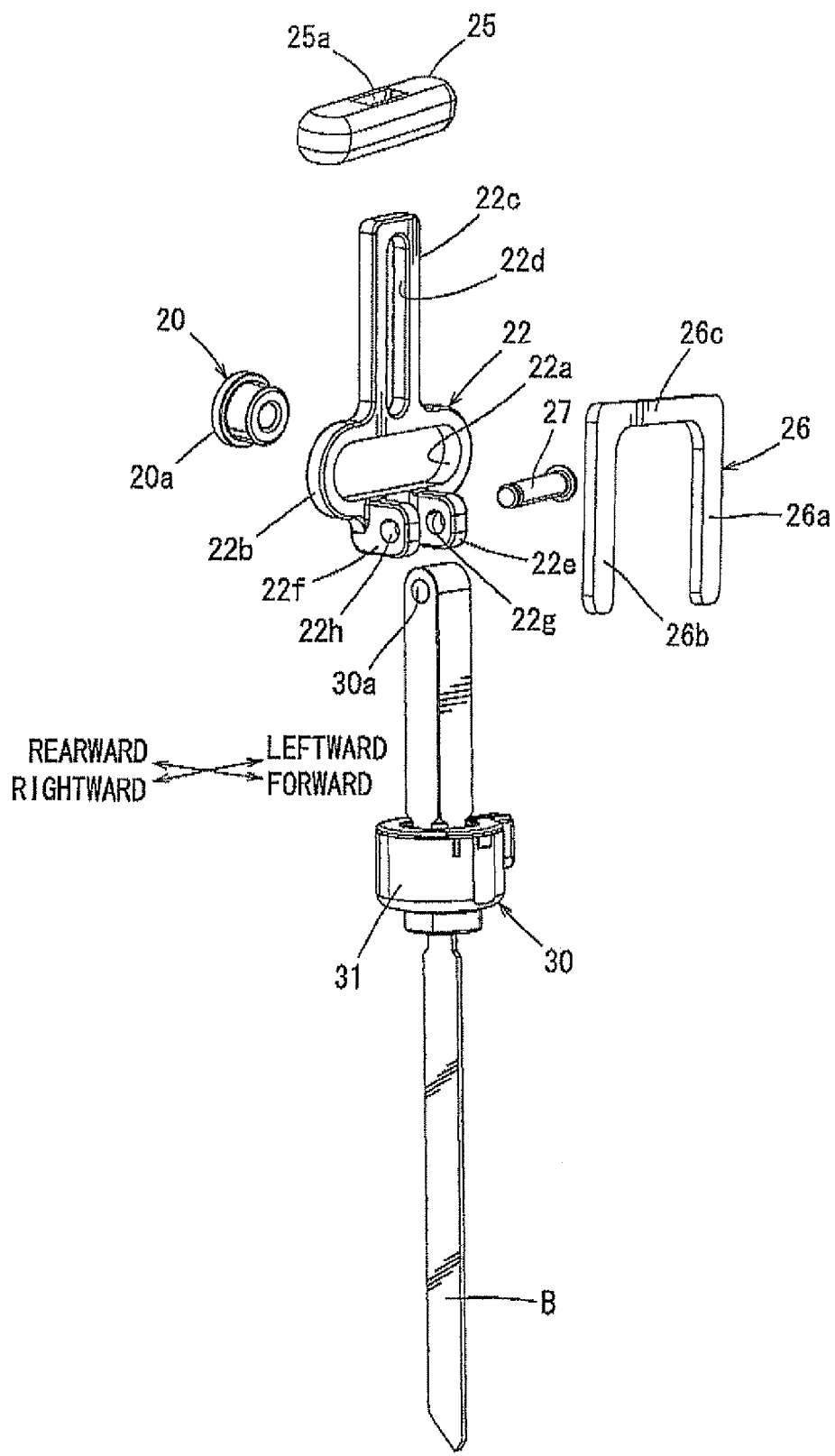
FIG. 4 is an exploded perspective view of the motion converting mechanism.

The guide member 20 is a cylindrical roller, and is provided with a flange portion 20a at a rear portion thereof. The guide member 20 is inserted into a guide groove portion 22a of a slider 22. As shown in FIG. 4, the slider 22 has a shape like a T-shaped flat plate and includes a guide plate portion 22b elongated in the lateral direction (left and right direction) and a support plate portion 22c elongated in the vertical direction. In this example, a member manufactured by a sheet-metal working process (so-called, a sheet-metal member) is employed as the slider 22. Therefor; the slider 22 can be manufactured at a low cost by stamping a steel plate or the like. A guide groove portion 22a is formed on the guide plate portion 22b. The guide groove portion 22a is configured as a slot elongated in the lateral direction. The guide groove portion 22a is formed to have a widthwise dimension which allows the guide member 20 to be displaced leftward and rightward without rattling.

A support plate portion 22e extends upward from a center of an upper portion of the guide plate portion 22b. A relief hole 22d for reducing the weight is provided through the supporting plate portion 22c in the thickness direction thereof. The support plate portion 22c has a flat plate shape having a rectangular cross section. The support plate portion 22c is inserted into a support hole 25a of a slider guide 25 from below. The slider guide 25 is attached between the left and right housing halves 10L and 10R. The support hole 25a has a rectangular shape which allows the support plate portion 22c of the slider 22 to be displaced in the vertical direction without rattling. Because the support plate portion 22c is inserted into the square support hole 25a, the rattling movement mainly in the lateral direction (the direction orthogonal to a paper plane of FIG. 2) is restricted.

The slider guide 25 is supported between the left and right housing halves 10L and 10R such that the slider guide 25 can rotate about an axis extending in the lateral direction orthogonal to the paper plane of FIG. 2. As the slider guide 25 is rotatable about the axis in the lateral direction, movement or vibration in the forward and rearward direction of the support plate portion 22c and hence the slider 22 is absorbed, and an accumulative error with respect to the body housing 10, which may be generated in machining or assembling of the related components, can be absorbed.

A support plate 26 slidably contacts a front surface of the slider 22. As shown in FIG. 4, the support plate 26 is formed into an inverted U-shape including left and right vertical support portions 26a and 26b elongated in the vertical direction, and a lateral support portion 26c connecting upper end portions of the left and right vertical support portions 26a and 26b and elongated in the lateral direction. As shown in FIG. 3, the support plate 26 is fixed by inserting the left and right vertical support portions 26a and 26b into holding grooves 10a provided in the left and right housing halves 10L and 10R, respectively. Left and right front end surfaces of the guide plate portion 22b of the slider 22 are in sliding contact with the left and right vertical support portions 26a and 26b of the support plate 26, respectively. More specifically, the left and right vertical support portions 26a and 26b are in sliding contact with the front surface of the guide plate portion 22b in a state of not closing the guide groove portion 22a. The support plate portion 22c of the slider 22 is in sliding contact with the lateral support portion 26c of the support plate 26.

The flange portion 20a of the guide member 20 inserted into the guide groove portion 22a is in sliding contact with a rear surface of the guide plate portion 22b of the slider 22. In this manner, the guide plate portion 22b of the slider 22 is supported by the support plate 26 on the front side and the flange portion 20a on the rear side in a state of being clamped in the thickness direction without rattling in the forward and rearward direction. As described above, the slider 22 is restricted from forward, rearward, leftward and rightward displacements also due to insertion of the support plate portion 22c into the support hole 25a of the slider guide 25.

A pair of left and right rod support portions 22e and 22f are provided at the center of a lower portion of the guide plate portion 22b of the slider 22 so as to protrude forward in parallel to each other. The rod support portions 22e and 22f are formed with respective support holes 22g and 22h having the same axis. An upper portion of the rod 30 is supported between the left and right rod support portions 22e and 22f. The rod 30 is supported by the slider 22 so as to be pivotable in the forward and rearward direction by means of a support hole 30a and a support shaft 27. The support hole 30a is provided in the upper portion of the rod 30. The support shaft 27 is inserted into the support holes 22g and 22h of the left and right rod support portions 22e and 22f. The rod 30 has a rectangular shaft shape having a rectangular cross section, and is restricted at the upper portion thereof from rattling in the upward, downward, leftward and rightward directions and is also restricted from rotating about its axis by being held between the left and right rod supporting portions 22e and 22f. The rod 30 is protruded downward through a support hole 38a formed in a bush 38 attached to the body housing 10. The support hole 38a of the bush 38 is formed into a rectangular hole having such a size that can restrict rattling in the lateral direction while allowing a pivotal motion of the rod 30 in the forward and rearward direction.

A clamp device 31 for mounting the blade B is provided at a lower portion of the rod 30 protruding from the body housing 10. The clamping device 31 may be a known clamp device and will not be described in detail. In this example, the clamp device 31 is a so-called tool-less type clamp device that allows easy mounting and removing of the blade B without using a specific tool. The clamp device 31 includes an operation sleeve 31a biased by a spring in one direction with respect to the rotational direction about the axis of the rod 30. By rotating the operation sleeve 31a against the biasing force of the spring, the blade B can be easily removed. On the other hand, by rotating the operation sleeve 31a in the opposite direction by using the biasing force of the spring, the blade B inserted from below can be locked in a mounted state.

As the crank disk 11 rotates by the activation of the electric motor 6, the guide member 20 makes an orbital motion about the supporting shaft 15. As the guide member 20 engaged with the guide groove portion 22a of the slider 22 makes the orbital motion, the lateral component of the motion thereof is absorbed due to movement along the guide groove portion 22a, while the vertical component of the motion causes the slider 22 to make a vertical reciprocating motion. As the slider 22 makes the vertical reciprocating motion, the rod 30 makes a reciprocating motion integrally therewith, whereby the blade B makes a vertical reciprocating motion to achieve the cutting work.

As shown in FIG. 2, the crank disk 11 includes a first cam plate portion 11a and a second cam plate portion 11b provided integrally with the rear surface of the crank disk 11 at positions adjacent thereto in the thickness direction of the crank disk 11. A flat-plate-shaped balancer 32 is supported on the rear surface side of the crank disk 11 so as to be capable of making a vertical reciprocating motion. The first cam plate portion 11a is engaged with the balancer 32. The balancer 32 makes a vertical reciprocating motion by the rotation of the first cam plate portion 11a rotating with the crank disk 11. The balancer 32 makes a vertical motion in the direction opposite to the direction of vertical motion of the rod 30 and the blade B. The balancer 32 functions as a balance weight for balancing in weight of the motion converting mechanism 3, so that potential vibrations and noises of the jigsaw 1 are reduced by the balancer 32.

An actuation plate 33 having a flat plate shape similar to the balancer 32 is supported on the rear surface side of the balancer 32 so as to be capable of making a vertical reciprocating motion. The second cam plate portion 11b is engaged with the actuation plate 33. As the crank disk 11 rotates the actuation plate 33 makes a vertical reciprocating motion in the same direction as the balancer 32 by a stroke smaller than that of the balancer 32. A roller holder 34 is provided below the actuation plate 33 so as to be pivotable in the vertical direction about a support shaft 35. A backup roller 36 is rotatably supported at a front end portion of the roller holder 34. The backup roller 36 is in contact with a rear edge of the blade B.

A lower end portion of the actuation plate 33 is in abutment with a rear portion 34a of the roller holder 34 from above. As the actuation plate 33 moves downward, the rear portion 34a of the roller holder 34 is pushed downward. Therefore, the roller holder 34 pivots about the support shaft 35 counterclockwise in FIG. 2, whereby the backup roller 36 is displaced forwardly and obliquely upward to push the blade B forward. Because the blade B is pushed forward by the back roller 36, a force for cutting the workpiece W is applied to the blade B. As the actuation plate 33 moves upward, the backup roller 36 returns backward and obliquely downward by being pushed by the blade B. In this manner, by pushing the blade B periodically forward by the backup roller 36 when the blade B moves upward, the blade B can make a orbital motion (a reciprocating motion in the vertical direction while pivoting slightly in the forward and rearward direction), whereby an efficient cutting work can be made by the applied to the blade B. FIG. 2 shows a state in which the rod 30 and the blade B are returned to the upper stroke end, and the balancer 32 is positioned at a lower stroke end, and the actuation plate 33 is moved to the lower stroke end so that the backup roller 36 is displaced forwardly and obliquely upward.

Since a semi-circular arc portion 37a of a switching rod 37 is in abutment with the rear portion 34a of the roller holder 34 from above, in the state shown in FIG. 2, the roller holder 34 is locked to a position where the roller holder 34 is rotated counterclockwise and pushes the roller 36 against the rear edge of the blade B. When the switching rod 37 is rotated by approximately 90° counterclockwise in FIG. 2, a relief portion 37b of the switching rod 37 is opposed to the rear portion 34a of the roller holder 34, so that a state in which the roller holder 34 is rotatable clockwise in FIG. 2 is resulted. Therefore, in this state, by the upward displacement of the actuation plate 33, the backup roller 36 is pushed by the blade B and is displaced rearward and obliquely downward.

A dust cover 40 having a semi-circular shape in cross section and formed of transparent resin is supported on the front portion of the body housing 10 so as to be movable in the vertical direction. FIG. 1 and FIG. 2 show a state in which the dust cover 40 has been retracted upward. By moving the dust cover 40 downward to a position for shielding the front and left and right sides of the blade B, visibility of the cutting portion is secured, and cutting chips are prevented from scattering around. A guard bar 39 is mounted to the front portion of the body housing 10 and protrudes downward in a manner like a U-shape so as to be positioned in front of the blade B.

According to the motion converting mechanism 3 of this example configured as described above, the slider support structure for vertically reciprocally supporting the slider 22 is configured to reciprocally movably hold the slider 22 between the flange portion 20a of the guide member 20 and the support plate 26 in the thickness direction, and therefore, the left and right guide rails forming the U-shape in the known device are no longer necessary. Since the left and right guide rails for reciprocally movably supporting the slider can be omitted, it is no longer necessary to provide rail mounting bases that are necessary for assembling the guide rails to each other with a high degree of accuracy. Thus, the gear housing cover of the known device can be omitted.

In the known device, due to the need of providing the rail mounting bases for mounting the left and right guide rails on the housing with a high degree of accuracy, for example, a die-cast aluminum (metallic) gear housing cover is necessary, and hence the weight reduction of the jigsaw is difficult. In contrast, according to the slider supporting structure of the above example, the left and right guide rails and the metallic gear housing cover provided with the rail mounting bases can be omitted, and therefore, the motion converting mechanism 3 is lightweight, and hence, the jigsaw 1 is light weight. In addition, the assembling operation of the jigsaw 1 as well as the motion converting mechanism 3 can be easily efficiently performed.

Further, since the slider 22 which supports the rod 30 is supported in the state of being held between the flange portion 20a of the guide member 20 and the support plate 26 in the thickness direction, the rod 30 is prevented from being bent to be angled at a joint portion (support shaft 27) to the slider 22 due to a cutting resistance or the like applied to the blade B by the cutting work, and hence another problem does not occur by the omission of the left and right guide rails of the known.

In addition, since the slider 22 is formed of a flat-plate-shaped sheet-metal member, the motion converting mechanism 3 can be downsized in the forward and rearward direction (thickness direction of the slider 22) in comparison with the U-shaped slider of the known device.

Since the configuration in which the slider 22 is held by using the flange portion 20a of the guide member 20 is employed, in this point as well, it is possible to achieve reduction in the number of components and downsizing of the construction in comparison with the configuration in which an additional holding member is provided. The support plate 26 for holding the front side of the slider 22 is formed into a U-shape including the left and right vertical support portions 26a and 26b and the lateral support portion 26c, and therefore, it is configured to slidably contact the slider 22 over a minimum range required for supporting the slider 22. Hence, it is possible to achieve reduction in weight of the supporting plate 26, and therefore, it is possible to achieve reduction in weight and downsizing of the motion converting mechanism 3.

In addition, the slider guide 25 configured to support the support plate portion 22c of the slider 22 is supported so as to be rotatable about the axis extending in the direction of a plane of the slider 22, whereby the displacement of the slider 22 in the forward and rearward direction is arrowed. Therefore, it is possible to adsorb a potential accumulative error in the machining accuracy and a potential accumulative error in assembling the related members which constitute the motion converting mechanism 3, so that smooth reciprocating motions of the rod 30 and the blade B can be achieved.

Figure 5:
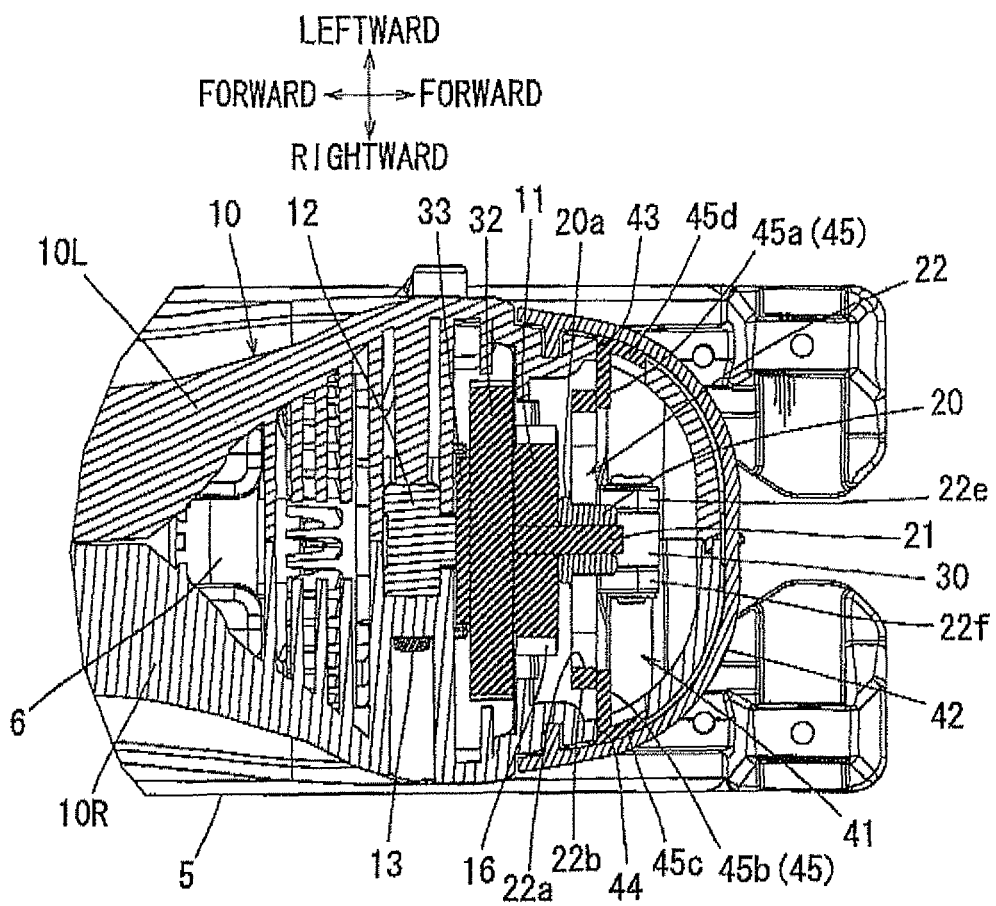
FIG. 5 is a horizontal sectional view of a front portion of a jigsaw and showing a motion converting mechanism according to a second example.

Various modifications may be made to the first example described above. FIG. 5 shows a motion converting mechanism 41 according to a second example. The motion converting mechanism 41 of the second example includes a die-cast aluminum front cover 42 instead of the transparent resin dust cover 40 in the first example. A cover thinner and lighter than the gear housing cover in the known device is employed as the front cover 42. The front cover 42 provides robustness of the front portion of the body housing 10.

In the second example, a support plate 45 is employed instead of the support plate 26 of the first example. As shown in FIG. 5, the slider 22 is supported so as to be capable of making a vertical reciprocating motion by being held between the support plate 45 and the flange portion 20a of the guide member 20 in the thickness direction of the slider 22, and in this respect, a principal function of the support plate 45 is the same as the support plate 26 of the first example.

Figure 6:
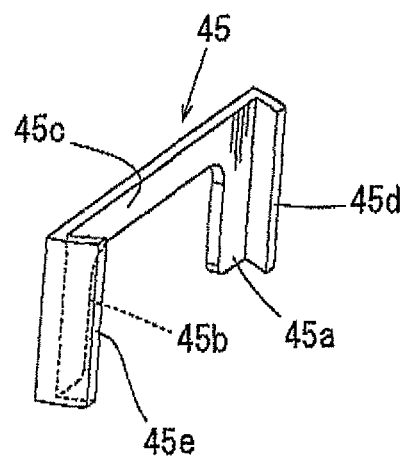
FIG. 6 is a perspective view of a support plate of the second example.

The support plate 45 of the second example is shown separately in FIG. 6. The support plate 45 has an inverted U-shape having a pair of left and right vertical support portions 45a and 45b, and a lateral support portion 45c connecting between upper portions of the vertical support portions 45a and 45b, and in this respect, the support plate 45 has a shape similar to the support plate 26 of the first example and the portions 45a, 45b and 45c have the same functions as the corresponding portions of the support plate 26.

The support plate 45 of the second example is different from the supporting plate 26 of the first example in that heat dissipating portions 45d and 45e are provided along the left and right vertical support portions 45a and 45h. In the case of the second example, for the material of the support plate 45, a sheet-metal member manufactured by stamping a steel plate is used, and the left and right heat dissipating portions 45d and 45e are formed by forwardly bending end edges of the left and right vertical support portions 45a and 45b, respectively.

As shown in FIG. 5, the left and right heat dissipating portions 45d and 45e of the support plate 45 are fitted into support window portions 43 and 44 formed to extend through the left and right housing halves 10L and 10R, respectively, so that the support plate 45 is fixed in position with respect to the vertical direction and the forward and rearward direction. In addition, the left and right heat dissipating portions 45d and 45e fitted into the support window portions 43 and 44 are brought into contact with the die-cast aluminum front cover 42. Therefore, heat that may be generated in the support plate 45 by the friction due to sliding contact of the slider 22 for the vertical reciprocating motion can be released to the front cover 42 via the heat dissipating portions 45d and 45e, whereby heat dissipating properties of the reciprocal motion converting mechanism 41 can be enhanced.

In this manner, in the second example, due to omission of the gear housing cover in the known device, reduction in weight of the motion converting mechanism 41 is achieved and, by using the die-cast aluminum front cover 42 instead of the resin-made dust cover 40 of the first example, robustness of the front portion of the body housing 10 and the heat dissipating properties of the motion converting mechanism 41 are enhanced, and hence the durability is improved.

Figure 7:
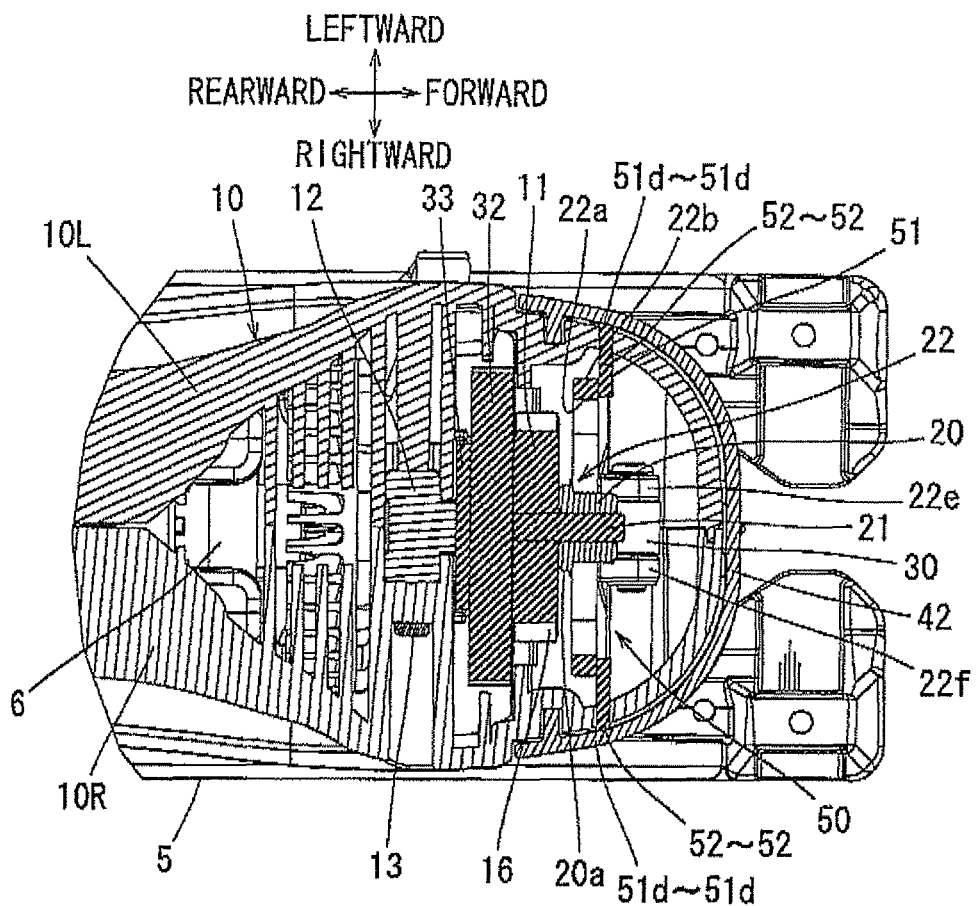
FIG. 7 is a horizontal sectional view of a front portion of a jigsaw and showing a motion converting mechanism according to a third example.
Figure 8:
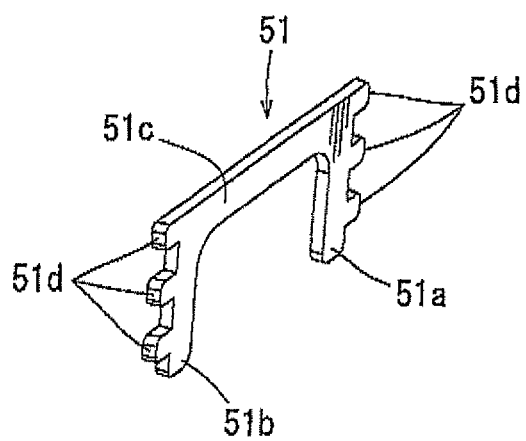
FIG. 8 is a perspective view of a supporting plate of the third embodiment.

FIG. 7 and FIG. 8 show a motion converting mechanism 50 according to a third example. The motion converting mechanism 50 of the third example is different from the second example described above in a supporting plate 51 having heat dissipating portions 51d. In other respect, the motion converting mechanism 50 is the same as the motion converting mechanism 41 of the second example. Therefore, in FIGS. 7 and 8, like members are given the same reference signs as the second example and the description of these members will not be repeated.

As shown in FIG. 8, similar to the first and second examples, the supporting plate 51 of the third example is a sheet-metal member formed by stamping a steel plate and has a U-shape including left and right vertical support portions 51a and a lateral support portion 51c. The heat dissipating portions 51d provided on the left and right vertical supporting portions 51a and 51h are configured differently from the heat dissipating portions 45e and 45d of the second example. In the second example, edge portions of the left and right vertical support portions 45a and 45b are forwardly bent over the entire length to form the heat dissipating portions 45d and 45e. In contrast, in the third example, three separate heat dissipating portions 51d protruding laterally are provided in each of the left and right vertical support portions 51a and 52b.

In the case of the third example, three rectangular support window portions 52 are formed to extend through each of the left and half housing halves 10L and 10R at positions corresponding to the heat dissipating portions 51d positioned on each of left and right sides. As shown in FIG. 7, the support plate 51 is held to be fixed in position between the left and right housing halves 10L and 10R in a state in which the respective heat dissipating portions 51d are inserted into the supporting window portion 52. The heat dissipating portions 51d inserted into the respective supporting window portion 52 are brought into contact with the die-cast aluminum front cover 42.

The friction heat generated in the supporting plate 51 by the reciprocating motion of the slider 22 is dissipated after being released to the front cover 42 via left and right heat dissipating portions 51d that are six in total. Therefore, the durability of the motion converting mechanism 50 may be enhanced in the same manner as the second example.

The first to third examples described above may further be modified in various manners. For example, the rod 30 having the tool-less type clamping device can be replaced with a rod to which the blade B is fixed by using a screw or the like.

Although the configuration in which the flange portion 20a is provided on the guide member 20, and the slider 22 is held between the flange portion 20a and the support plate 26 (45, 51) in the thickness direction has been used in the first to third examples, this configuration can be replaced with a configuration in which the flange portion 20a is omitted, while a support plate similar to the support plate 26 (45, 51) on the front side is added to the rear side, so that the slider 22 is held between the support plates from opposite sides in the thickness direction of the slider 22.

In addition, although a sheet-metal member formed by stamping a steel plate is used for the slider 22 in the first to third examples and a sheet-member is also used for each of the support plates 45 and 51 of the second and third examples, sheet-metal members manufactured by cutting steel blocks can be used for the slider 22 and the support plates 45 and 51.

What is claimed is:

1. A reciprocating cutting tool comprising:
a body housing;
an electric motor; and a motion converting mechanism configured to convert rotation of the electric motor into a reciprocating motion of a rod having a blade mounted thereon, wherein:
the electric motor and the motion converting mechanism are disposed within the body housing,
the motion converting mechanism includes a crank disk configured to be rotated by the electric motor, a guide member eccentrically mounted to the crank disk and configured to make an orbital motion by the rotation of the crank disk, and a slider capable of reciprocating in a reciprocating direction of the rod and configured to transmit to the rod a component of the orbital motion of the guide member in the reciprocating direction to cause the reciprocating motion of the rod,
the slider has a flat plate shape and includes a guide plate portion and a support plate portion;
the guide plate portion has a guide groove portion engaging the guide member;
the support plate portion extends in the reciprocating direction of the rod,
the guide plate portion is held from opposite sides in a direction of thickness of the flat plate shape by a flange portion provided on the guide member and a support plate mounted on the body housing, so that the guide plate portion is prevented from moving in the direction of thickness; and
the support plate portion is inserted into a support hole formed in a slider guide provided in the body housing, so that the support plate portion is prevented from moving in a direction perpendicular to a plane of the support plate portion.

2. The reciprocating cutting tool as in claim 1, wherein the support plate has a flat plate shape formed into an inverted U-shape and includes a pair of left and right vertical support portions and a lateral support portion connecting upper portions of the vertical support portions, opposite end portions of the guide plate portion of the slider are in sliding contact with the left and right vertical support portions, and the support plate portion of the slider is in sliding contact with the lateral support portion.

3. The reciprocating cutting tool as in claim 1, wherein the slider guide is movably supported by the body housing in the thickness direction of the slider.

4. The reciprocating cutting tool as in claim 1, wherein the body housing is made of synthetic resin and is split into left and right housing halves with respect to a plane extending in a longitudinal direction of the tool, the guide plate portion of the slider is held in the thickness direction between the guide member and a support plate attached between the left and right housing halves.

5. The reciprocating cutting tool as in claim 4, further comprising a cover made of die-cast aluminum and attached to an outer surface of the body housing, wherein the support plate contacts the cover, so that heat produced at the support plate is dissipated via the cover.

6. A reciprocating cutting tool comprising:
a motion converting mechanism configured to convert rotation of a rotary member into a reciprocating motion of a slider coupled to a rod capable of mounting a blade thereon, and
a slider support mechanism comprising a first support mechanism and a second support mechanism disposed at different positions along a reciprocating direction of the slider and each supporting the slider such that the slider can move in the reciprocating direction; wherein:
the first support mechanism includes a first member and a second member disposed on opposite sides of the slider in a holding direction perpendicular to the reciprocating direction and each slidably contacting the slider,
the second member is a guide member coupled to the rotary member and making an orbital motion as the rotary member rotates,
the first member has a first surface slidably contacting the slider and extending within a first plane parallel to the reciprocating direction; and
the second member has a second surface slidably contacting the slider and extending within a second plane parallel to the first plane.

7. The reciprocating cutting tool according to claim 6, wherein the second support mechanism comprises a slider guide having a support hole vertically slidably receiving the slider.

8. The reciprocating cutting tool according to claim 6, wherein the slider has a configuration of a plate having a thickness in the holding direction.

9. The reciprocating cutting tool according to claim 6, wherein the first member has a configuration of a plate having a thickness in the holding direction.

10. The reciprocating cutting tool according to claim 6, further comprising a body housing accommodating the motion converting mechanism, wherein the first member is fixed in position relative to the body housing and the second member is coupled to the rotary member and movable relative to the body housing.

* * * * *